United States Patent Office 2,947,765
Patented Aug. 2, 1960

2,947,765

PREPARATION OF THE 12-KETO ISOMER OF CORTISONE

Percy L. Julian, Oak Park, Arthur Magnani, Wilmette, and Chappelle C. Cochrane, Maywood, Ill., assignors, by mesne assignments, to Chas. Pfizer & Co., Inc., Brooklyn, N.Y., a corporation of Delaware No Drawing. Filed Dec. 7, 1955, Ser. No. 551,510

2 Claims. (Cl. 260—397.45)

This invention relates to novel steroid derivatives. More particularly, it relates to 4-pregnene-17α,21-diol-3,12,20-trione, the 12-keto isomer of cortisone, to the preparation thereof and to intermediates useful for its preparation.

The 12-keto isomer of cortisone is useful as an intermediate for the preparation of known valuable steroids. For example, because of the fortuitous steric hindrance of the 12-keto substituent, it is possible to prepare the 3,20-dicyclic ketal of this new steroid, to remove the 12-keto substituent, e.g., by a Clemmenson-type reduction or by a Huang-Minlon-type reduction, to obtain the 3,20-diketal of Reichstein's Substance S, which on hydrolysis yields Reichstein's Substance S, a physiologically-active compound. This product can be converted by microbiological oxidation and subsequent treatment to cortisone and hydrocortisone. Thus, it can be seen that our invention provides useful chemotherapeutic products and methods for the preparation of intermediate compounds for the synthesis of chemotherapeutic agents.

It is accordingly an object of the present invention to prepare compounds useful in the preparation of therapeutically-active compounds.

A specific object is to produce the 12-keto isomer of cortisone.

Another object is to provide methods for accomplishing the foregoing objects.

As the starting material for the preparation of the steroid compounds of our invention, we use pregnane-3α,12α-diol-20-one diacetate, which can be prepared from desoxycholic acid by known means.

This material, by bromination and dehydrobromination, as disclosed in U.S. Patent 2,667,498, is converted to 16-pregnene-3α,12α-diol-20-one diacetate. The 16-pregnene derivative, by treatment with alkaline hydrogen peroxide, according to the method disclosed in U.S. Patent 2,705,233, is transformed into 16,17-epoxypregnane-3,12-diol-20-one. After preferentially esterifying the 3α-hydroxy group of this compound by treatment thereof with succinic anhydride, in the presence of pyridine, the 12α-hydroxy group is oxidized to 12-keto with chromic acid. Thereafter, the 3-semisuccinate ester is hydrolyzed and the free 3-hydroxy group reacetylated. By treatment of the epoxide with hydrogen bromide, the vicinal bromohydrin is formed. This, as described in copending U.S. application of Julian et al., Serial No. 143,146, filed February 8, 1950, now U.S. Patent 2,816,108, on treatment with Raney nickel, can be debrominated to pregnane-3α,17α-diol-12,20-dione 3-acetate. This product can then be brominated in the 21-position as described in copending U.S. application of Julian et al., Serial No. 354,868, filed May 13, 1953, now U.S. Patent 2,789,989. Following hydrolysis of the 3-acetoxy group, the 21-bromo group can be replaced with acyloxy, as described in U.S. Patent 2,596,563. The 3-hydroxy group is then oxidized to a 3-keto substituent, e.g., with N-bromosuccinimide. The 3,12,20-trione derivative is then brominated at the 4-position, followed by dehydrobromination in the conventional manner to produce the desired 4-pregnene-17α,21-diol-3,12,20-trione 21-acetate, which can be hydrolyzed to the free 21-hydroxy compound with potassium formate and methanol, as disclosed in copending U.S. application of Julian et al., Serial No. 323,701, filed December 2, 1952, now abandoned.

This series of reactions is represented by the following formulae:

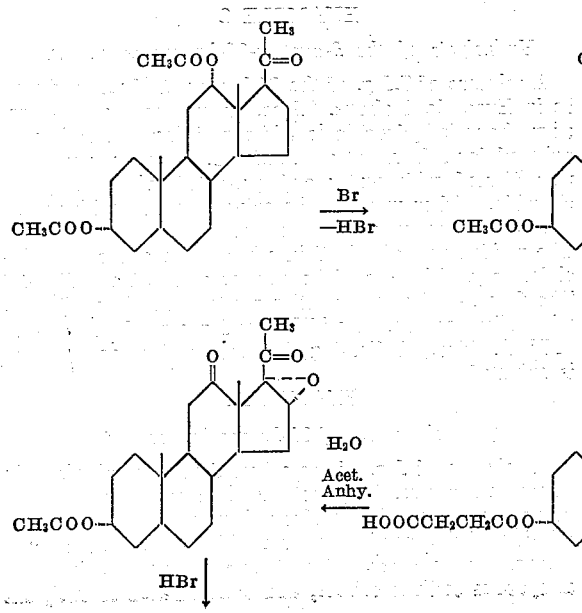
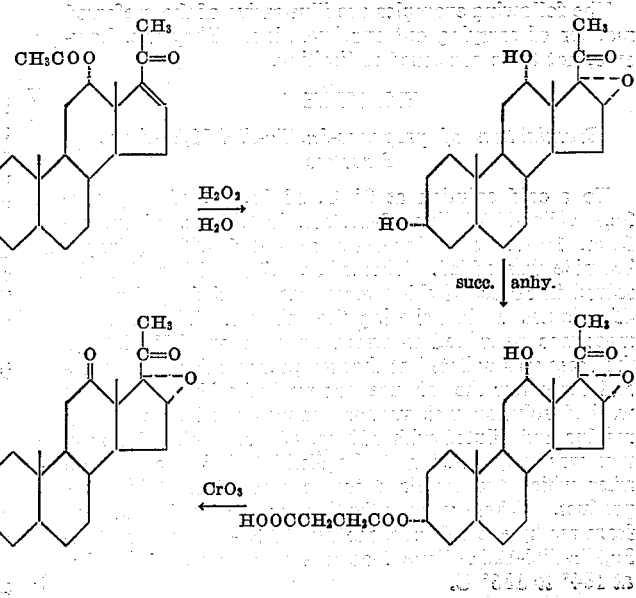

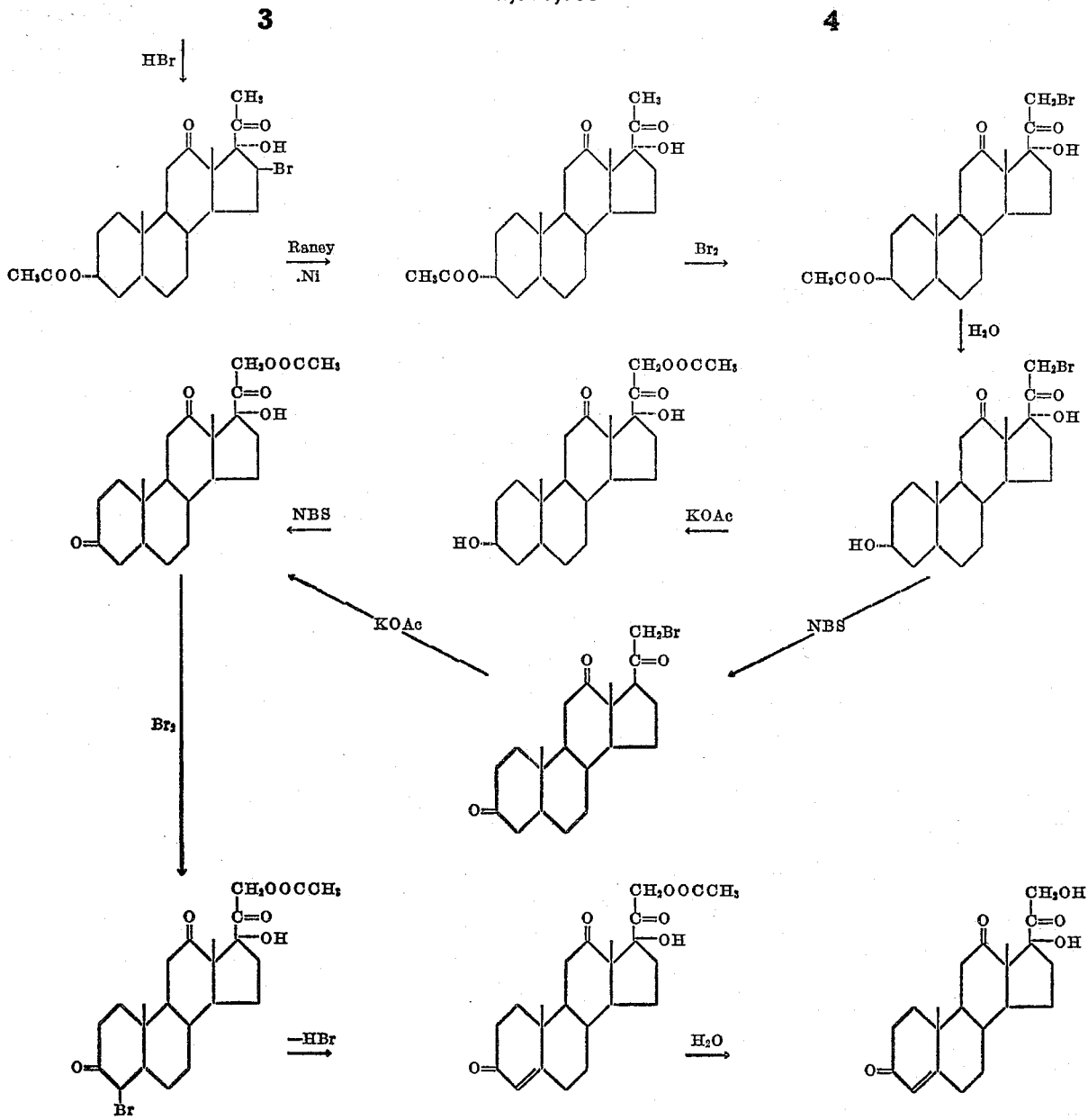

The following examples are illustrative of the preferred manner of carrying out our invention. They are, however, not to be construed as limiting.

EXAMPLE 1

*Bromination of pregnane-3α,17α-diol-12,20-dione 3-acetate*

To a cold solution at 0° C. of 11.7 g. of pregnane-3α,17α-diol-12,20-dione 3-acetate, in 200 cc. of chloroform, 30 cc. of chloroform saturated with hydrogen bromide was added. Thereafter, 4.8 g. of bromine dissolved in 50 cc. of chloroform was added dropwise over 45 minutes while agitating the mixture. The resultant mass was permitted to warm up to about 25° C., and the mass was agitated at that temperature for 15 minutes and thereafter the mixture was washed with water. The washed solution was vacuum concentrated to a syrupy residue and diluted with 117 cc. of methanol. The mixture was evaporated until the distillate boiled at 65° C., after which the distilland was cooled to crystallize the product. After recrystallization of the crude material from methylene chloride, the desired 21-bromo-pregnane-3α,17α-diol-12,20-dione 3-acetate was obtained, melting at 184° to 186° C.

EXAMPLE 2

*Hydrolysis of the 3-acetate-21-bromo compound*

A mixture of 7.5 g. of the 21-bromo product produced as in Example 1 above, 75 cc. of methanol and 40 cc. of methanolic hydrochloric acid containing 10% HCl, was agitated for 5 hours at about 25° C. The clear solution was diluted with water and extracted with methylene chloride. After washing the solvent extract with water, the washed solvent was evaporated to a low volume. The residue was dissolved in ether and evaporated to incipient crystallization. The mass was cooled and filtered. The free 3-hydroxy derivative melted at 90° to 100° C. with effervescence, resolidified and remelted at 152° to 157° C. (dec.) indicating that the product as obtained is solvated.

EXAMPLE 3

*Replacement of 21-bromo by acetoxy*

A mixture of 5 g. of the solvated product obtained in Example 2 above, 10 g. of potassium acetate and 80 cc. of acetone, was boiled under reflux for 18 hours. After dilution of the reaction mixture with water, the mass was extracted with ether. The ether extract was dried over anhydrous sodium sulfate, and concentrated to incipient crystallization. After cooling and filtering the precipitate, the product was recrystallized from a mixture of ether and petroleum-ether. The pregnane-3α,17α,21-triol-12,20-dione 21-acetate melted at 180° to 184° C. The material contained some halogen, which, after being debrominated with zinc and acetic acid, melted at 187–8° C.

EXAMPLE 4

Oxidation of the 3-hydroxy group

To a solution of 1.25 g. of the product obtained as described in Example 3 above in 14 cc. of methylene chloride, were added 42 cc. of t-butyl alcohol and 2 cc. of pyridine. The mass was cooled to 5° C. and 1.0 g. of N-bromosuccinimide was added. The mixture was permitted to stand for about 16 hours without any further temperature control. The mixture was extracted with methylene chloride, and the extract was washed with successive portions of aqueous sodium bisulfite, dilute aqueous sodium hydroxide, dilute hydrochloric acid, and finally with water until the extract was neutral. Thereafter, the solvent was removed in vacuo and the residue was crystallized from a mixture of methylene chloride and petroleum-ether. After several recrystallizations from ether-petroleum-ether, the product melted at 158° to 160° C.

Analysis.—Calculated for $C_{23}H_{32}O_6$: C=68.29, H=7.97. Found: C=68.13, H=8.18.

$(\alpha)_D^{25} = +87°$ (0.4% in acetone)

Alternatively, the 21-bromo-pregnane-3α,17α-diol-12,20-dione, prepared as in Example 2 above, can be oxidized to the corresponding 3-keto-21-bromo derivative, M.P. 202° to 203° C. from acetone, by treatment with N-bromosuccinimide. This, upon reaction with potassium acetate in acetone suspension, is converted to a product identical with the product obtained above, pregnane-17α,21-diol-3,12,20-trione 21-acetate.

EXAMPLE 5

Bromination of the 3-keto compound

To a solution of 3.35 g. of pregnane-17α,21-diol-3,12,20-trione 21-acetate, in 100 cc. of glacial acetic acid, 2 cc. of a solution of 1.33 g. of bromine in 40 cc. of glacial acetic acid were added. The mixture was cooled until crystals of acetic acid began to appear. Thereafter, 0.61 g. of sodium acetate dissolved in 20 cc. of glacial acetic acid was added to the remainder of the bromine solution, and the mixture was added dropwise to the cold reaction mass during about ½ hour. The mixture was diluted with 1 liter of cold water and the resultant slurry was extracted with methylene chloride. The extract was washed with water, with aqueous sodium carbonate and finally with water. The washed extract was evaporated to induce crystallization. In this manner, a total of 3.14 g. of crude product melting between 148° and 152° C. (two crops) was obtained.

Analysis.—For $C_{23}H_{31}O_6Br$: Calculated, Br=16.56. Found, Br=16.2.

$(\alpha)_D^{25} = +105°$ (0.4% in acetone)

EXAMPLE 6

Debromination of the 4-bromo compound

A mixture of 393 mg. of semicarbazide hydrochloride, 295 mg. of sodium bicarbonate, 21 cc. of t-butyl alcohol and 0.7 cc. of water was heated on a steam bath. To this mixture, 680 mg. of the 4-bromo derivative prepared in Example 5 above, 20 cc. t-butyl alcohol and 8.5 cc. of methylene chloride were added. A current of nitrogen was passed into the reaction vessel to replace the air. The mixture was held at about 25° C. for two hours and 1.4 cc. of water and 7 cc. of glacial acetic acid were added. The mixture was heated to and maintained at 70° to 80° C. for 2 hours and then permitted to cool and stand at about 25° C. for about 16 hours. After dilution with water, the mass was extracted with methylene chloride. The extract was washed with water. The washed extract was evaporated to a low volume and crystallized by the addition of ether. A first crop of 385 mg. of product melting at 180° to 185° C., and a second crop of 30 mg. melting at 177° to 183° C., were obtained. After recrystallization from a mixture of methylene chloride and ether, the product melted at 190° to 191° C.

Analysis.—For $C_{23}H_{30}O_6$: Calculated, C=68.63; H=7.51. Found: C=68.19; H=7.82.

$(\alpha)_D^{25} = +135°$ (0.4% in acetone)
$\quad\quad = +117°$ (0.54% in chloroform)

$E_{1\,cm.}^{1\%} = 417$ at 239 m$\mu$

EXAMPLE 7

Hydrolysis of the 21-acetoxy group

A solution of 1.25 g. of the 12-keto isomer of cortisone acetate prepared as in Example 6 above in 30 cc. of methanol at about 25° C. was placed in an atmosphere of nitrogen. To the solution, 3.5 cc. of a 0.4 N-methanol solution of potassium hydroxide was added. After 10 minutes the mass was rendered acid by the addition of acetic acid. On standing the product crystallized from the reaction mixture. There was obtained in this manner 0.80 g. melting at 244° to 246° C. An additional amount, 0.14 g., was obtained by extraction of the mother liquor.

$(\alpha)_D^{25} = +132°$ (0.5% in chloroform)

$E_{1\,cm.}^{1\%} = 467.4$ at 239 m$\mu$

It will be seen from the above examples that a synthesis of the 12-keto isomer of cortisone has been provided. It will be apparent that numerous variations in the experimental detail are possible. For example, although hydroxyl groups at the 3- and 21-positions of the steroid compounds have at times been blocked or protected by conversion to the acetate esters, other esters can be used for this purpose. Thus, the propionate, benzoate, naphthoate, hemisuccinate, picolinate and the like esters can be used to protect the hydroxyl groups against undesired reaction at various stages of the novel synthesis. Similarly, alkali-metal salts of other lower fatty acids can be used to replace the 21-bromo group as taught by U.S. Patents 2,596,562 and 2,596,563. Also, other means of carrying out the individual steps can be resorted to. For example, instead of hydrolyzing the 21-acyloxy group with alcoholic potash, potassium formate and methanol, as disclosed in the aforementioned copending Serial No. 323,701, can be used. The introduction of the double bond at the 4,5-position can be effected with dinitrophenyl hydrazine instead of the semicarbazide method. In a similar fashion, a variety of solvents and reaction conditions within the purview of the skilled artisan is possible.

Also, the oxidation of the 3-OH groups to a keto group can be carried out in a variety of the ways known to the art, such as with chromic acid, by the Oppenauer method, etc.

In the steps leading to the removal of the 12-keto group subsequent to procedures contemplated by the present invention, the diketal formation can be carried out by any suitable method such as is shown by U.S. Patents 2,648,662; 2,648,663; 2,288,854 and 2,312,482.

Accordingly, various modifications can be made in the present invention without departing from the spirit or scope thereof. It is to be distinctly understood that our invention includes such modifications and is to be limited only as defined in the claims appended hereto.

Having described the invention, what is claimed is:

1. The process which comprises brominating a pregnane compound of the general formula

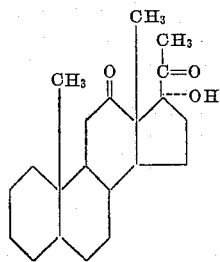

which also possesses in the 3-position an acyloxy group of a lower hydrocarbon carboxylic acid and in which the valences not shown are satisfied by hydrogen to form the 21-bromo derivative, hydrolyzing to form a 3-hydroxy group, treating the resulting 3-hydroxy-21-bromo compound with an alkali metal salt of a lower fatty acid to replace the 21-bromo group with the acyloxy group of the alkali metal salt and oxidizing the 3-OH group to a keto group to form a 17α,21-dihydroxy-3,12,20-trione-21-mono-acylate compound, and thereafter brominating to introduce a 4-bromo group and then removing the elements of HBr from the resulting brominated compound to produce a $\Delta^4$-pregnene compound.

2. The process which comprises brominating pregnane-3α,17α-diol-12,20-dione-3-acylate, in which the 3-acyl group is the acyl group of a lower hydrocarbon monocarboxylic acid, to form the 21-bromo derivative, hydrolyzing to form a 3-hydroxy group, treating the resulting 3-hydroxy-21-bromo compound with an alkali metal salt of a lower carboxylic acid to replace the 21-bromo group with the acyloxy group of the alkali metal salt and oxidizing the 3-OH group to a keto group to form pregnane-17α,21-diol-3,12,20-trione-21-mono-acylate, and thereafter brominating to introduce a 4-bromo group and then removing the elements of HBr, and finally hydrolyzing to form 4-pregnene-17α,21-diol-3,12,20-trione.

References Cited in the file of this patent

UNITED STATES PATENTS

| Re. 22,941 | Reichstein | Nov. 25, 1947 |
| 2,408,828 | Wagner | Oct. 8, 1946 |
| 2,667,498 | Julian | Jan. 26, 1954 |

FOREIGN PATENTS

| 825,686 | Germany | Dec. 20, 1951 |

OTHER REFERENCES

Fieser et al.: Natural Products Related to Phenanthrene, 3rd ed., page 450 (1949).

Adams et al.: J. Chem. Soc. (London), 2209–13 and 4688–9 (1954).